United States Patent
Beredimas et al.

(10) Patent No.: US 11,553,000 B2
(45) Date of Patent: Jan. 10, 2023

(54) SYSTEMS AND METHODS FOR USING NAMESPACES TO ACCESS COMPUTING RESOURCES

(71) Applicant: Citrix Systems, Inc., Fort Lauderdale, FL (US)

(72) Inventors: Ioannis Beredimas, Salonika (GR); Lampros Dounis, Patras (GR); Panagiotis Matzavinos, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 284 days.

(21) Appl. No.: 16/663,832

(22) Filed: Oct. 25, 2019

(65) Prior Publication Data

US 2021/0006596 A1 Jan. 7, 2021

Related U.S. Application Data

(63) Continuation of application No. PCT/GR2019/000046, filed on Jul. 1, 2019.

(51) Int. Cl.
H04L 9/40 (2022.01)

(52) U.S. Cl.
CPC .............. H04L 63/20 (2013.01); H04L 63/10 (2013.01)

(58) Field of Classification Search
CPC ..... H04L 63/20; H04L 63/10; H04L 63/0227; G06F 21/554; G06F 21/567
See application file for complete search history.

(56) References Cited

U.S. PATENT DOCUMENTS

| | | | |
|---|---|---|---|
| 7,613,703 B2* | 11/2009 | Kakivaya | G06F 16/10 |
| 8,327,019 B2* | 12/2012 | Gould | H04L 41/50 |
| | | | 709/238 |
| 2006/0074876 A1 | 4/2006 | Kakivaya et al. | |
| 2011/0047292 A1 | 2/2011 | Gould et al. | |
| 2015/0172320 A1 | 6/2015 | Colombo et al. | |
| 2016/0119379 A1* | 4/2016 | Nadkarni | H04L 63/101 |
| | | | 726/1 |
| 2016/0352739 A1* | 12/2016 | McGovern | H04L 63/20 |
| 2017/0244761 A1* | 8/2017 | Baukes | H04L 63/1433 |
| 2018/0027006 A1* | 1/2018 | Zimmermann | G06F 21/6218 |
| | | | 726/11 |
| 2018/0115550 A1* | 4/2018 | Sapir | H04L 63/102 |

OTHER PUBLICATIONS

S. Pozo, AFPL2, an abstract language for firewall ACLs, with NAT support, 2009, Spain.*

(Continued)

*Primary Examiner* — Robert B Leung
(74) *Attorney, Agent, or Firm* — Foley & Lardner LLP

(57) ABSTRACT

Systems and methods described herein provide for building policies using namespaces. A device may receive a request to access a resource in a computing environment. The request may include one or more attributes. The device may identify a set of namespaces having domain-specific policy grammar to generate domain-specific policies. The device may determine a namespace from the identified set of namespaces which corresponds to the one or more attributes of the request. The device may generate, using domain-specific policy grammar of the determined namespace, a domain-specific policy to apply to the request.

20 Claims, 4 Drawing Sheets

(56) References Cited

OTHER PUBLICATIONS

Caramujo J, Rodrigues da Silva A, Monfared S, Ribeiro A, Calado P, Breaux T. RSL-IL4Privacy: a domain-specific language for the rigorous specification of privacy policies. Requirements Engineering. Mar. 2019; 24(1):1 -26. (Year: 2019).*
H. Hamdi, M. Mosbah and A. Bouhoula, "A Domain Specific Language for Securing Distributed Systems," 2007 Second International Conference on Systems and Networks Communications (ICSNC 2007), 2007, pp. 76-76, doi: 10.1109/ICSNC.2007.2. (Year: 2007).*
Examination Report on AU Appl. No. 2019441820 dated May 4, 2021.
Damiani E, et al, "Extending Policy Languages to the Semantic Web", Journal of Universal Computer Science 20(8), 2014, pp. 1130-1151, doi: 10.3217/jucs-020-08-1130.
Examination Report on AU Appl. No. 2019441820 dated Mar. 3, 2022.
International Preliminary Report on Patentability on PCT Appl. No. PCT/GR2019/000046 dated Jan. 13, 2022.
Arie Van Deursen et al: "Domain-specific languages", ACM SIGPLAN Notices, ACM, 2 Penn Plaza, Suite 701 New York, NY 10121-0701 USA, vol. 35, No. 6, Jun. 1, 2000 (Jun. 1, 2000), pp. 26-36, XP058238670, ISSN: 0362-1340, DOI: 10.1145/352029.352035.
Gasca R M et al: "AFPL2, an Abstract Language for Firewall ACLs with NAT Support", Dependability, 2009. DEPEND '09. Second International Conference on, IEEE, Piscataway, NJ, USA, Jun. 18, 2009 (Jun. 18, 2009), pp. 52-59, XP031516825, ISBN: 978-0-7695-3666-8, pp. 52-56; table 1.
International Search Report and Written Opinion for PCT Appl. No. PCT/GR2019/000046, dated Mar. 18, 2020.
Markus W Weissmann: "Domain Specific Language for Specifying Access Controls", Apr. 30, 2007 (Apr. 30, 2007), XP055675875, Retrieved from the Internet: URL:http://citeseerx.ist.psu.edu/viewdoc/download?doi=10.1.1.73.4360&rep=repl&type=pdf [retrieved on Mar. 11, 2020] paragraph [04.3].
Examination Report on CA Appl. No. 3097695, dated Nov. 20, 2021.
Examiner's Report on CA Appl. No. 3097695 dated Sep. 9, 2022.
First Office Action on CN Appl. No. dated Aug. 15, 2022.
Pozo, S., et al., "AFPL2, An Abstract Language for Firewall ACLs with NAT support", IEEE, pp. 52-56.

* cited by examiner

SYSTEMS AND METHODS FOR USING NAMESPACES TO ACCESS COMPUTING RESOURCES

CROSS-REFERENCE TO RELATED APPLICATION

This application is a continuation of International Application No. PCT/GR2019/000046, filed Jul. 1, 2019, the content of which is incorporated herein by reference in its entirety.

FIELD OF THE DISCLOSURE

The present application generally relates to computing systems and networks, including but not limited to the use of namespaces to access resources of a computing environments.

BACKGROUND

In a computing environment, a user may operate a client device to request access to a given resource within the computing environment. To authorize the user access to the resource, a policy may be applied to the request to determine whether or not the user is to be permitted (or denied) access to the resource.

BRIEF SUMMARY

The present disclosure is directed towards systems and methods for building a policy decision point using namespaces (e.g., using arbitrary 3rd party extensions that use namespaces). Some policy decision points may be narrowly tailored (e.g., purpose-built policy decision points), but may miss some specific (or arbitrary) use cases. Other policy decision points may be general-purpose, but have a somewhat poor vocabulary to accommodate as many use cases as possible.

According to the implementations described herein, the following systems and methods alleviate the tradeoff between purpose built Policy Decision Points (PDPs) and respective policy grammars and general-purpose PDPs. The purpose built PDPs are often expressive and auditable, yet such PDPs are tightly coupled with respective Policy Enforcement Points (PEPs). Thus, purpose-built PDPs often are limited to support self-sufficient features and limited use cases. General-purpose PDPs are generic, yet lack expressiveness, fail to capture restrictions and logic associated with arbitrary third party PEPs, and are harder to audit.

The embodiments described herein include namespaces over an extensible Attribute Based Access Control (ABAC) grammar and PDP system. The namespaces provide for hierarchical policy domains with purpose-built vocabulary (e.g., that can be used to identify actors/subjects, verbs/actions, objects/targets, conditions, obligations) which are specific to a dedicated namespace. By including namespaces, the systems and methods described herein provide a bridge between the aforementioned general-purpose PDPs and purpose-built PDPs. Furthermore, the systems and methods described herein provide for $3^{rd}$ party configuration of namespaces. As such, the systems described herein are extensible to address arbitrary policy use cases.

In one aspect, this disclosure is directed to a method. The method includes receiving, by at least one computing device, a request to access a resource in a computing environment. The request may include one or more attributes. The method includes identifying, by the at least one computing device, a set of namespaces having domain-specific policy grammar to generate domain-specific policies. The method includes determining, by the at least one computing device, a namespace from the identified set of namespaces that corresponds to the one or more attributes of the request. The method includes generating, using domain-specific policy grammar of the determined namespace, a domain-specific policy to apply to the request.

In some embodiments, the determined namespace includes at least one nested namespace having a subset of the domain-specific policy grammar from the selected namespace. In some embodiments, the method further includes selecting, according to the one or more attributes of the request, a nested namespace from the at least one nested namespace, and generating, using domain-specific policy grammar of the nested namespace, the domain-specific policy to apply to the request. In some embodiments, the domain specific grammar of the determined namespace is applicable to a plurality of resources, and the subset of domain-specific grammar is applicable to a subset of the plurality of resources including the resource associated with the request. In some embodiments, the method further includes applying the generated domain-specific policy to the request to identify an effect of the domain-specific policy for the resource, to permit or deny access to the resource. The method may further include permitting or denying access to the resource according to the effect.

In some embodiments, the method further includes selecting the namespace with one or more target attributes that match to the one or more attributes of the request. In some embodiments, the one or more target attributes include at least one of a subject, an action, an object or an environment. In some embodiments, the set of namespaces includes at least one of a database namespace, a networking product namespace, a file access namespace, a content filtering namespace, antivirus namespace, a uniform resource locator (URL) browsing namespace or an applications namespace. In some embodiments, the domain-specific policy grammar from the selected namespace includes a plurality of categories of policy grammar. In some embodiments, the method further includes receiving a user-defined (e.g., custom or third-party) namespace for incorporation into the set of namespaces. The method may further include incorporating the user-defined namespace into the set of namespaces.

In another aspect, this disclosure is directed to a device. The device includes at least one processor configured to receive a request to access a resource in a computing environment. The request may include one or more attributes. The at least one processor may be further configured to identify a set of namespaces having domain-specific policy grammar to generate domain-specific policies. The at least one processor may be further configured to determine a namespace from the identified set of namespaces which corresponds to the one or more attributes of the request. The at least one processor may be further configured to generate, using domain-specific policy grammar of the determined namespace, a domain-specific policy to apply to the request.

In some embodiments, the determined namespace includes at least one nested namespace having a subset of the domain-specific policy grammar from the selected namespace. In some embodiments, the at least one processor is further configured to select, according to the one or more attributes of the request, a nested namespace from the at least one nested namespace, and generate, using domain-specific policy grammar of the nested namespace, the domain-specific policy to apply to the request. In some embodiments, the domain specific grammar of the determined namespace is applicable to a plurality of resources. The subset of domain-specific grammar may be applicable to a subset of the plurality of resources including the resource associated with the request.

In some embodiments, the at least one processor is further configured to apply the generated domain-specific policy to the request to identify an effect of the domain-specific policy for the resource, to permit or deny access to the resource, and permit or deny access to the resource according to the effect. In some embodiments, the at least one processor is further configured to select the namespace with one or more target attributes that match to the one or more attributes of the request. In some embodiments, the domain-specific policy grammar from the selected namespace includes a plurality of categories of policy grammar. In some embodiments, the at least one processor is further configured to receive a user-defined namespace for incorporation into the set of namespaces, and incorporate the user-defined namespace into the set of namespaces.

In another aspect, this disclosure is directed to a non-transitory computer readable medium storing program instructions for causing one or more processors to receive a request to access a resource in a computing environment. The request may include one or more attributes. The one or more processors may be configured to identify a set of namespaces having domain-specific policy grammar to generate domain-specific policies. The one or more processors may be configured to determine a namespace from the identified set of namespaces which corresponds to the one or more attributes of the request. The one or more processors may be configured to generate, using domain-specific policy grammar of the determined namespace, a domain-specific policy to apply to the request.

In some embodiments, the determined namespace includes at least one nested namespace having a subset of the domain-specific policy grammar from the selected namespace.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
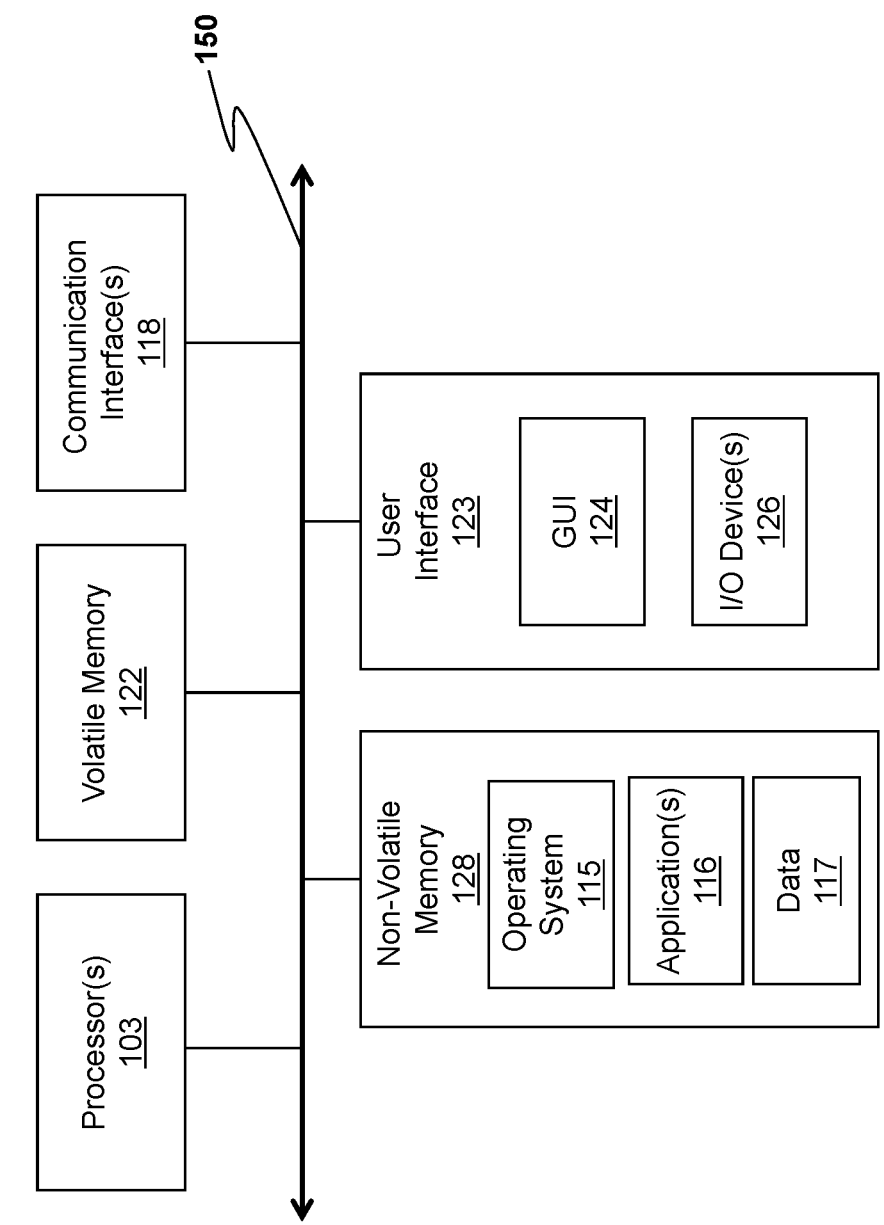
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for building a policy decision point using namespaces.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for Building a Policy Decision Point using Namespaces

The present disclosure is directed towards systems and methods for building a policy (e.g., including a policy decision point) with for example arbitrary 3rd party extensions using namespaces. Some policy decision points may be narrowly tailored (e.g., purpose-built policy decision points), but may miss some specific (or arbitrary) use cases. Other policy decision points may be general-purpose, but have a somewhat poor vocabulary to accommodate as many use cases as possible.

According to the implementations described herein, the following systems and methods alleviate the tradeoff between purpose built Policy Decision Points (PDPs) and respective policy grammars and general-purpose PDPs. The purpose built PDPs are often expressive and auditable, yet such PDPs are tightly coupled with the respective Policy Enforcement Points (PEPs). Thus, purpose-built PDPs often are limited to support self-sufficient features and limited use cases. General-purpose PDPs are generic, yet lack in expressiveness, fail to capture the restrictions and logic associated with arbitrary third party PEPs and are harder to audit.

The embodiments described herein include namespaces over an extensible Attribute Based Access Control (ABAC) grammar and PDP system. The namespaces provide for hierarchical policy domains with purpose-built vocabulary (e.g., including actors/subjects, verbs/actions, objects/targets, conditions, obligations) which are specific to a dedicated namespace. By including namespaces, the systems and methods described herein provide a bridge between the aforementioned general-purpose PDPs and purpose-built PDPs. Furthermore, the systems and methods described herein can provide for configuration (e.g., $3^{rd}$ party configuration) of namespaces. As such, the systems described herein are extensible to address arbitrary policy use cases.

In a given policy framework, an entity may be permitted or denied (generally referred to as authorization) access to various resources under specific conditions. The authorization may be defined in a form of policies and rules (e.g., by a policy administrator, for instance). To authorize a user to a given resource, a number of systems and/or subsystems within a general policy framework evaluate the policy rules as applied to the resource. The user requests access to a resource from a Policy Enforcement Point (PEP). The PEP communicates attributes of the request (e.g., to access a resource) and user identification information to a Policy Decision Point (PDP) for evaluation against the policy. The PDP retrieves the policy that is applicable to this user from the Policy Retrieval Point (PRP) and any other related user information from the Policy Information Point(s) (PIP). When all the information is available the PDP evaluates the policy rules and sends a permit or deny response along with supplementary obligations back to the PEP so that the authorized access is enforced.

Some PDPs may be defined in different manners. For instance, some PDPs may be "tightly coupled" with a well-defined ecosystem of PEPs. Such PDPs may include a domain-specific grammar but can also feature rich vocabulary. Other PDPs may be "loosely coupled," with somewhat generic grammar but somewhat poor vocabulary to accommodate as many use cases as possible.

The difference of the two approaches can be illustrated via a simple example of a content filtering and antivirus solution, intended to prevent access to un-safe, prohibited, illegal and/or infected material. A PEP intercepts outgoing traffic and queries a purpose built PDP to determine if the respective URL or file download should be allowed or not. The purpose built PDP is configured to prevent malicious, illegal and non-safe activity or traffic via integration with two different policy information point), PIPs, a URL categorization database and an antivirus scanner.

A tightly coupled PDP may include a domain-specific vocabulary that can support, cover and/or describe the appropriate resources (e.g., URLs, files), actions (e.g., browse, download), conditions (category, infection flag) and obligations (e.g., allow, block, redirect, email notification). In addition it would be aware of restrictions, i.e. appreciate that the "browse/download" action is only applicable over URLs/files respectively, redirect actions are only applicable to URLs, be aware of the URL categories, etc. In a Role Based Access Control (RBAC) language and model, certain actors are allowed (or denied) to perform actions on resources when a condition exists. Such a loosely coupled PDP may fail to capture the domain specific rules, including but not limited to available actions, resources, action/resource mappings, conditions and obligations. Typos or mistakes in policy syntax, potentially including simple case-sensitive errors like URL Browsing instead of browsing can lead into policies not taking effect, without any visible warning. The policy administrator's intent to block "Adult" content may prove ineffective if he is unaware that the category name returned by the respective PIP is an arbitrary value.

Some attribute based access control (ABAC) systems may include generic policy language with an extensible vocabulary. Whereas RBAC systems require pre-defined roles and permission sets, ABAC systems allow for evaluation of arbitrary attributes over the subject (actor), object (resource being affected/accessed), action (operation being executed) and environment (miscellaneous contextual information like time of day or location). In some instances, the policy grammar may be augmented within a hierarchy system to provide grouping of similar rules and policies, efficient processing, delegated administration, and so forth. While such hierarchies address issues like processing efficacy or delegated administration, such systems still fail to capture domain specific knowledge. Any given ABAC may include target attributes, conditions and obligations that remain open-ended, with little to no restrictions being enforced by the policy vocabulary.

In overcoming the aforementioned drawbacks of these individual types of PDPs, the embodiments described herein bridge the gap between tightly and loosely coupled PDPs through introduction of namespaces. The systems and methods described herein introduce a system and a method that defines not only a generic policy language but also an extensible vocabulary that can facilitate arbitrary 3rd parties, without compromising flexibility. Namespaces may be generated for specific resource types, with each namespace including a purpose-built vocabulary (actors/subjects, verbs/actions, objects/targets, conditions, obligations) specific to that particular namespace. Furthermore, a policy administrator may generate new namespaces to address arbitrary policy use cases. As such, the PDP may be extensible.

Figure 2:
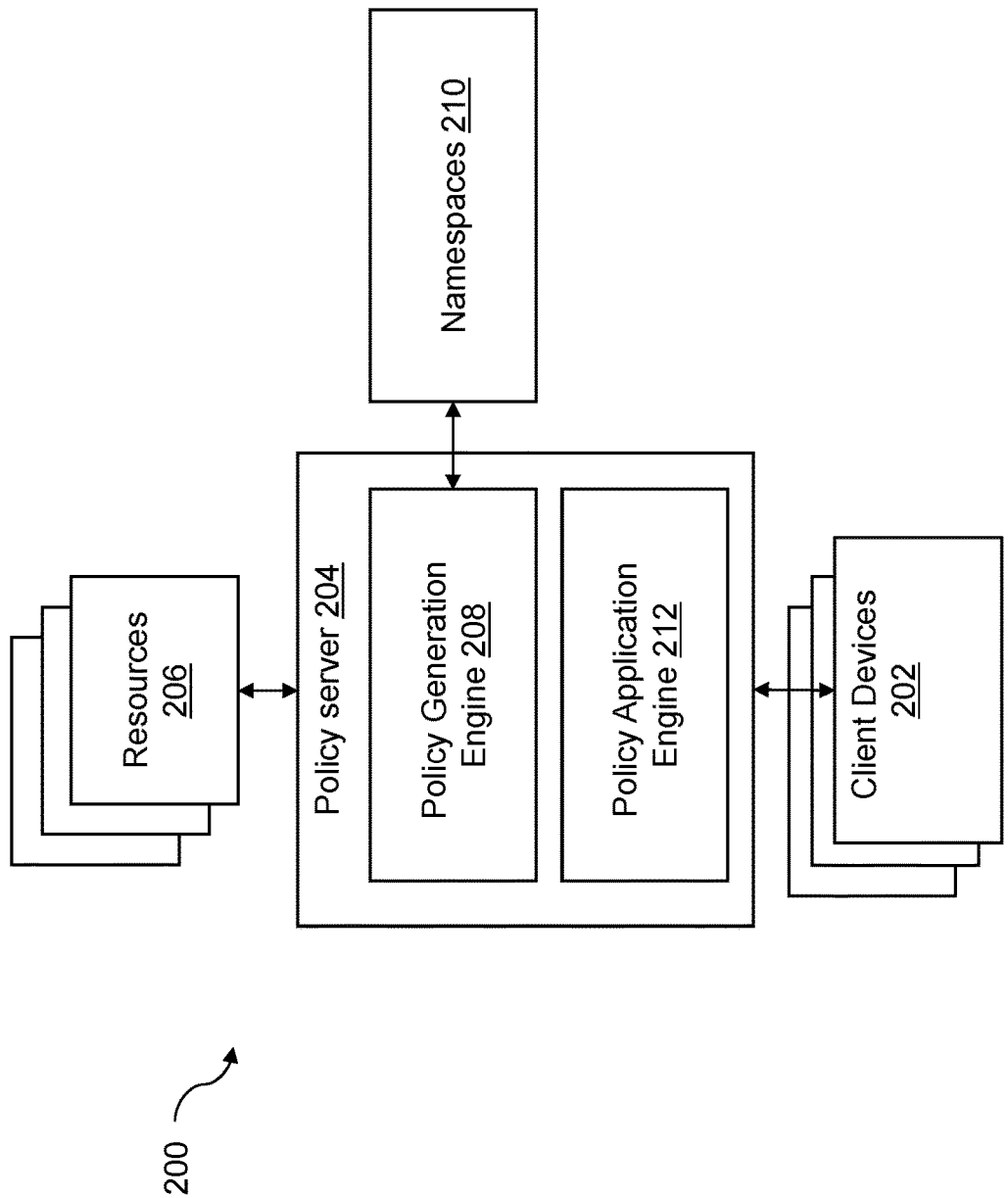
FIG. 2 is a block diagram of a system for controlling access to a resource in a computing environment.

Referring now to FIG. 2, depicted is a system 200 for controlling access to a resource in a computing environment. The system 200 is shown to include a client device 202, a policy server 204, and a plurality of resources 206. The policy server 204 is shown to include a policy generation engine 208 including, maintaining, or otherwise accessing a plurality of namespaces 210 and a policy application engine 212. Through the introduction of namespaces 210, the systems and methods described herein provide for scoped policy elements. The policy server 204 may be configured to receive (e.g., from the client device 202) a request to access a resource 206. The request may include various attributes (e.g., user identification information, resource information, client device 202 information, etc.). The policy server 204 may be configured to identify a set of namespaces 210 for generating domain-specific policies. The namespaces 210 may include domain-specific policy grammar. The policy server may determine a namespace 210 corresponds to the attributes from the request. The policy server 204 may generate a domain-specific policy to apply to the request using the domain-specific policy grammar of the determined namespace 210.

The systems and methods of the present solution may be implemented in any type and form of device, including clients, servers and/or appliances described above with reference to FIG. 1. As referenced herein, a "server" may sometimes refer to any device in a client-server relationship, e.g., the policy server 204 in a handshake with the client device(s) 202 and/or the resource(s) 206. The client device(s) 202, policy server 204, and/or resource(s) 206 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein. In some implementations, the policy server 204 may be arranged intermediary the client device 202 and resource(s) 206. The policy server 204 may be configured to receive requests from the client device 202 for accessing a resource 206, identify an applicable namespace 210, and generate and apply a domain-specific policy to the request to authorize access by the client device 202 to the resource 206, as described in greater detail below.

The resource(s) 206 may be or include any devices, components, servers, programs, sources, applications, and so forth which may be accessed by the client device 202. The resource(s) 206 may include any application or resource which generates data remotely and delivers such data to the client device 202. In some embodiments, the resource(s) 206 may be or include, websites, downloadable content, file sharing service, Software-as-a-Service (SaaS) applications, a virtual desktop, a virtual application, etc. The resource(s) 206 may be located, embodied on, or otherwise included in various servers which may be located remotely from the client devices 202. The resource(s) 206 may be or include data which may be accessed by the client device(s) 202. The resource(s) 206 (or an application, program, server, etc. which supports, maintains, or otherwise provides the resource(s) 206) may be configured receive a request from a client device 202 to access the resource 206 (e.g., specific data from or corresponding to the resource 206, for instance), and transmit the requested data to the client device 202.

The system 200 is shown to include a plurality of client devices 202. The client device(s) 202 may be or include aspects, features, and components similar to the computing device 101 described above. The client device(s) 202 may be or include, for instance, a desktop computer, a laptop computer, a smart phone or mobile device, a tablet, to name a few possibilities. The client device(s) 202 may host, execute, deliver, or otherwise provide applications or resources to a user (e.g., when requested). For instance, the client device(s) 202 may include a display or screen which renders a user interface including various icons for selecting applications, various navigation bars for inputting a Uniform Resource Locator (URL) for a particular webpage, and so forth. In each of these embodiments, the client device 202 may generally be configured to receive an input for accessing a resource 206 from a user.

The client device 202 may be configured to generate a request to include one or more attributes. The one or more attributes may be, for instance, information or data corresponding to the client device 202 issuing the request, information or data corresponding to the user requesting access to a resource 206, and/or information or data corresponding to the resource 206. The client device 202 may be configured to generate the request to identify information or data corresponding to the client device 202. For instance, the client device 202 may be configured to include information or data corresponding to an operating condition of the client device 202. For instance, the client device 202 may include information or data indicating, identifying, or otherwise corresponding to the network to which the client device 202 is connected. The client device 202 may be configured to identify (and include data in the request corresponding to) whether the client device 202 is connected to a secured or unsecured network, a password protected or open network, a personal or work network, trusted network, and so forth. The client device 202 may be configured to identify/generate a timestamp corresponding to the time of the input from the user and include the timestamp with the request. The client device 202 may be configured to identify a location of the client device 202 (e.g., based on geolocation data from a GPS sensor, based on a Wi-Fi network to which the client device 202 is connected, etc.). The client device 202 may be configured to include data corresponding to the location of the client device 202 in the request.

The client device 202 may be configured to generate the request to identify information or data corresponding to the resource 206 which is to be accessed by the user. The client device 202 may be configured to generate the request based on the input from the user. For instance, where the input is a selection of an icon for an application, the client device 202 may be configured to generate a request that indicates the corresponding application. As another example, where the input is a URL for a particular webpage, the client device 202 may be configured to generate a request that indicates the URL. The client device 202 may be configured to generate the request to identify the resource indicated in the request.

The client device 202 may be configured to generate the request to identify the user corresponding to the client device 202. The client device may identify the user based on log-in credentials provided by the user to the client device 202 (e.g., at start-up, for instance). The client device 202 may identify the user based on log-in credentials provided by the user for accessing a particular resource (e.g., log-in credentials for a website or application). In some embodiments, the client device 202 may be uniquely associated with a particular user (e.g., the user's laptop, mobile phone, dedicated work computer, etc.). The client device 202 may maintain a user identifier associated with the user corresponding to the client device 202. The client device 202 may provide the user identifier in the request. In still other embodiments, the client device 202 may provide a unique identifier corresponding to the client device 202 with the request.

The client device 202 may be configured to deliver, transmit, or otherwise provide the request to the policy server 204. The client device 202 may provide the request to the policy server 204 across, on, or via a computer network. The computer network may be similar to the computer network described above with reference to the communications interfaces 118 for the computer 101. Hence, computer network may be a Local Area Network (LAN), a Wide Area Network (WAN), a Personal Area Network (PAN), or the Internet through a variety of wired and/or wireless or cellular connections. The policy server 204 may be configured to receive the request via the computer network. The policy server 204 may be configured to parse the request to identify the user generating the request (e.g., by extracting the log-in credentials provided in the request, by extracting the user identifier included in the request, by extracting the unique identifier of the client device 202 and cross-referencing the unique identifier of the client device with a plurality of unique identifiers to identify a user corresponding to the client device 202, and so forth). The policy server 204 may be configured to parse the request to identify the target resource 206 indicated in the request. As described in greater detail below, the policy server 204 may be configured generate a domain-specific policy for applying to the request using the namespaces 210 corresponding to the request.

The policy server 204 is shown to include a policy generation engine 208 and a policy application engine 212. The policy generation engine 208 may be any device, component, processor, software, script or application designed or implemented to generate a domain-specific policy. The policy application engine 212 may be any device, component, processor, script or application designed or implemented to apply policies (including domain-specific policies generated by or via the policy generation engine 208) to a request for authorizing access to a resource. "Authorizing," as used herein, refers to selectively permitting and denying access to a particular resource.

The policy generation engine 208 may be configured to parse the request received from the client device 202. The policy generation engine 208 may be configured to parse the request to identify the attributes included in the request. As described above, the attributes may include information or data corresponding to the client device 202 issuing the request, information or data corresponding to the user requesting access to a resource 206, and/or information or data corresponding to the resource 206. The policy generation engine 208 may be configured to parse the request to identify each of the attributes included in the request. Hence, the policy generation engine 208 may be configured to identify conditions of the client device 202 issuing the request, the user requesting access to the resource 206, and the resource 206 itself. The policy generation engine 208 may be configured to use such information for selecting, identifying, or otherwise determining an applicable namespace 210 for generating the policy corresponding to the request.

Figure 3:
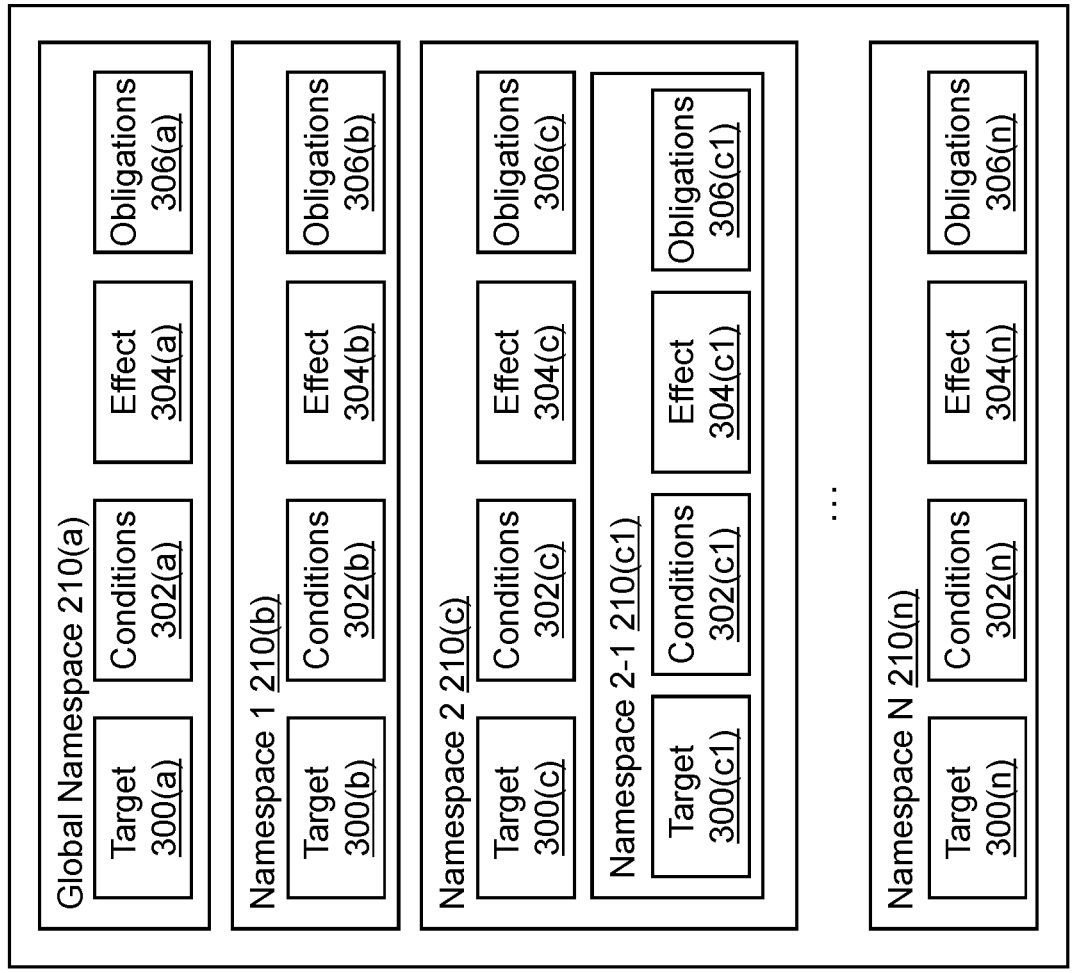
FIG. 3 is an example block diagram of a plurality of namespaces including respective domain-specific policy grammars.

As shown in FIG. 3, the policy generation engine 208 may be designed or implemented to identify a set of namespaces 210. Specifically, FIG. 3 depicts a plurality of namespaces 210 including a respective domain-specific policy grammar. As shown, each namespace 210 may include domain-specific policy grammar to generate domain-specific policies. A domain-specific policy grammar may be a policy grammar which is uniquely associated with a particular namespace 210. The domain-specific policy grammars may be applicable to a particular set of resources 206, particular types of resources 206, particular ways in which the resources 206 are accessed, and so forth. Hence, the domain-specific policy grammar for one namespace 210 may not be applicable to another namespace 210, and vice versa. Each policy grammar may be a structure, language, or defined set of "building blocks" which are used for defining a policy. As shown in FIG. 3, the domain-specific policy grammar may include a plurality of categories of policy grammars including, for instance, a target 300, condition 302, effect 304, and obligations 306. The policy grammar may specify operators which are acceptable (such as specific Boolean operators). For instance, the acceptable operators may include "equals", "more than", "less than", "between" (range), "in" (belongs to a set) etc.

The namespaces 210 may include a global namespace 210. The global namespace 210 may be a namespace 210 which is applicable across a plurality of tenants corresponding to respective client devices 202. A tenant may be or include a company, enterprise, or other organizational entity which is enrolled in registered with the system 200. Each tenant may be linked to or otherwise associated with respective client device(s) 202. The tenants may specify policies which are applied to the client devices 202 associated therewith. The namespaces 210 may include local namespaces 210 which are applicable to a single tenant corresponding to respective client devices 202. Hence, a local namespace 210 corresponding to one tenant may not be applicable to a different tenant. The namespaces 210 may include various namespaces 210(*b*)-210(*n*) (referred to generally as namespaces 210). In some embodiments, the namespaces 210 may be predefined namespaces 210 or user-defined namespaces 210. In some embodiments, the namespaces 210 may be nested within other namespaces 210 (e.g., namespace 2-1 210(*c*1)) is shown to be nested within namespace 2 210(*c*)). Each namespace 210 is shown to include a respective domain-specific grammar.

The namespaces 210 may be defined to correspond to a particular aspect of a computing environment. For instance, the namespaces 210 may include a database namespace (e.g., to control access to database resources), a networking product namespace (e.g., to control networking configurations and devices within the computing environment), a content filtering namespace (e.g., to filter, redact, redirect or otherwise prevent content from being delivered to a client device 202), an antivirus namespace (e.g., to authorize access to content/pages/resources following an antivirus scan), a URL browsing namespace (e.g., to authorize access to particular types or specific websites), an applications namespace (e.g., to authorize access to particular types or specific applications), to name a few non-limiting possibilities. Some namespaces 210 may be nested within another namespace 210. A namespace 210 may be nested within a parent namespace 210 to further define domain-specific policies for the particular aspect of the computing environment corresponding to the parent namespace 210. For instance, in a namespace 210 for networking products, certain policy elements may be applicable to flow of network traffic, other policy elements may be applicable to devices and hardware such as routers, while still other policy elements may be applicable to firewalls. A plurality of nested namespaces 210 may be defined within a networking device namespace 210 (e.g., a high-level namespace 210 corresponding to network traffic, a nested namespace 210 corresponding to firewalls, a nested namespace 210 corresponding to Network Address Translation (NAT) within the nested namespace 210 corresponding to firewalls, and so forth). Hence, the namespaces 210 may be extensible and targeted to capture a wide variety of use cases within the policy generation framework.

In implementations in which the namespace 210 is a user-defined namespace 210, the administrator may generate the namespace 210 on a client device linked to the policy server 204. Each namespace 210 may include a unique name (e.g., "Global Namespace," "Namespace 1," "Namespace 2," "Namespace 2-1," "Namespace n," and so forth). Where a new namespace 210 is to be nested within another namespace 210 (e.g., a parent namespace 210), the new namespace 210 may specify the parent namespace 210. In some implementations, each namespace 210 may specify a scope. The scope may define the applicability of the namespace 210 to various tenants. The scope may be local or global. For instance, a namespace 210 having a local scope may be applicable to one tenant. However, a namespace 210 having a global scope may be applicable to multiple tenants.

The target 300 may include, indicate, or correspond to a subject, an action, an object, and/or an environment corresponding to the request. Each target 300 may include one or more attributes. For example, where the namespace 210 is an antivirus namespace 210, the antivirus namespace 210 may specify targets 300 corresponding to actions (with an attribute corresponding to download) and object (with an attribute corresponding to file). As another example, where the namespace 210 is a content filtering namespace 210, the content filtering namespace 210 may specify targets 300 corresponding to actions (with an attribute corresponding to browsing), and objects (with attributes corresponding to specific URLs and/or categories of URLs). The subject may be the person (e.g., user) requesting access to the resource 206. The action may be the action which the subject (e.g., the user) requests to perform (such as download, save, view, share, etc.). The object may be an identification of the resource 206. The environment may be an environment of the client device 202 (e.g., a current time, an IP address for the client device 202, a network to which the client device 202 is connected, and so forth).

The conditions 302 may be defined based on the subject and using the acceptable Boolean operators, for instance. The conditions 302 may be configured to accept certain values for comparison against the subject. Each condition 302 for a given namespace 210 may include a condition name (with each name being unique for the respective namespace 210), a type of condition (e.g., Boolean condition, a numeric condition, a string condition, a date/time condition, and so forth), and a list of operators supported. As one example, a string condition may include a number of restriction values (e.g., ["val1", "val2", "val3"]) which are to be restricted. The string condition may include a supported operator of "equals" for the string condition. As such, the condition 302 may be defined to be satisfied when one of the restriction values ["val1", "val2", "val3"] "equals" a given target 300 attribute. A given namespace 210 may include any number of conditions 302. The namespace 210 may include conditions corresponding to subjects, actions, objects, and/or environments. The effect 304 may be or include an effect, result, or other outcome when the condition 302 is satisfied. The effect 304 may include, indicate, or otherwise correspond to a result of a condition (e.g., "permit," "deny," and "noop"). The "noop" effect 304 may provide for expression of policies not relevant to access control of resources 206. The obligations 306 may be or include various extraneous or supplementary functions for enforcement of the policy. The obligations 306 may include allow, block, redirect, email notification, etc.

Referring back to FIG. 2, the policy generation engine 208 may be configured to identify a namespace 210 from the set of namespaces 210. The policy generation engine 208 may identify the namespace 210 based on the attributes from the request in comparison to the attributes of a target 300 of a respective namespace 210. The policy generation engine 208 may select a namespace 210 based on the target 300 attribute (e.g., subject, action, object, environment) matching an attribute of the request. For instance, where the request includes a URL indicating the user is requesting to browse the internet, the request may include an attribute identifying the URL. The policy generation engine 208 may be configured to identify a content filtering namespace 210 based on the attribute from the request (e.g., URL) matching an attribute corresponding to a target 300 for the content filtering namespace 210. The policy generation engine 208 may be configured to determine that the content filtering namespace 210 corresponds to the attributes from the request (e.g., based on the attribute(s) from the request matching the attribute(s) corresponding to a target 300). In implementations in which a namespace 210 includes a plurality of nested namespaces 210, the policy generation engine 208 may select a nested namespace 210 based on the target 300 attribute for a particular nested namespace matching an attribute of the request. For instance, an attribute from a request may match a target 300 attribute corresponding to the nested namespace while not matching any attributes of the other nested namespace(s) 210.

The policy generation engine 208 may be configured to generate a domain-specific policy for applying to the request based on the domain-specific policy grammar of the namespace 210 corresponding to the request. As stated above, each namespace 210 may include targets 300, conditions 302, effects 304, and obligations 306. The policy generation engine 208 may use the domain-specific policy grammar (e.g., target 300, condition 302, effect 304, and obligation 306) to generate a domain-specific policy for the request. The policy generation engine 208 may generate the domain-specific policy for applying to the particular request (e.g., based on the attributes of the request, for instance). The policy generation engine 208 may be configured to generate the domain-specific policy by selecting, from specific categories of the domain-specific policy grammar, a condition 302, effect 304, and obligation 306 corresponding to the target 300 attribute used to select the namespace 210. The policy generation engine 208 may be configured to generate the domain-specific policy for applying to the request using the vocabularies specified in the policy grammars for the condition 302, effect 304, and obligation 306.

As one example, where the target 300 attribute is browsing, the conditions 302 may include a number of restriction values corresponding to a number of URLs which are to be restricted. The condition 302 may specify a Boolean operator of "equals." The effect 304 may be "deny," with the corresponding obligation 306 being "block." The policy generation engine 208 may generate the domain-specific policy specifying that, where the request specifies an attribute subject (e.g., URL) which equals one of the restriction values, the access to the webpage is denied (e.g., the user is redirected to a different webpage). As another example, where the target 300 attribute is downloading a file, the conditions 302 may a status of the file (e.g., whether or not the file is clean). The condition 302 may specify a Boolean operator of "equals." The effect 304 may be "permit," with the corresponding obligation 306 being "allow." The policy generation engine 208 may generate the domain-specific policy specifying that, where the request specifies an attribute object (e.g., file) having a status of clean (indicating the file was scanned via antivirus software), the access to the file is permitted (e.g., the user is allowed to download the file). While these two examples are provided, any number of domain-specific policies may be generated based on attributes from the request and the domain-specific policy grammars of a namespace 210 corresponding to the request, including policies specific to users (or types of users), network connections or conditions of the client device 202, and so forth.

The policy application engine 212 may be designed or implemented to apply the domain-specific policy to the request. The policy application engine 212 may apply the domain-specific policy generated by the policy generation engine 208 to the request to permit or deny access to the resource 206. The policy application engine 212 may receive the domain-specific policy from the policy generation engine 208. The policy application engine 212 may apply the domain-specific policy to the attributes of the request (e.g., the subject, action, object, or environment corresponding to the request). The policy application engine 212 may selectively permit/deny access to the resource 206 following application of the domain-specific policy to the request. Continuing the examples above, where the request is to access a website corresponding to a specific URL, the policy application engine 212 may apply the domain-specific policy to the request to determine whether the URL equals one of the restriction values. The policy application engine 212 may deny access to the webpage where the URL equals one of the restriction values (e.g., the user is redirected to a different webpage). Where the request is to download a file, the policy application engine 212 may apply the domain-specific policy to the request to determine whether the file has been scanned by an antivirus scanner. The policy application engine 212 may permit access to the file where the file antivirus status equals clean (e.g., the user is allowed to download the file).

Figure 4:
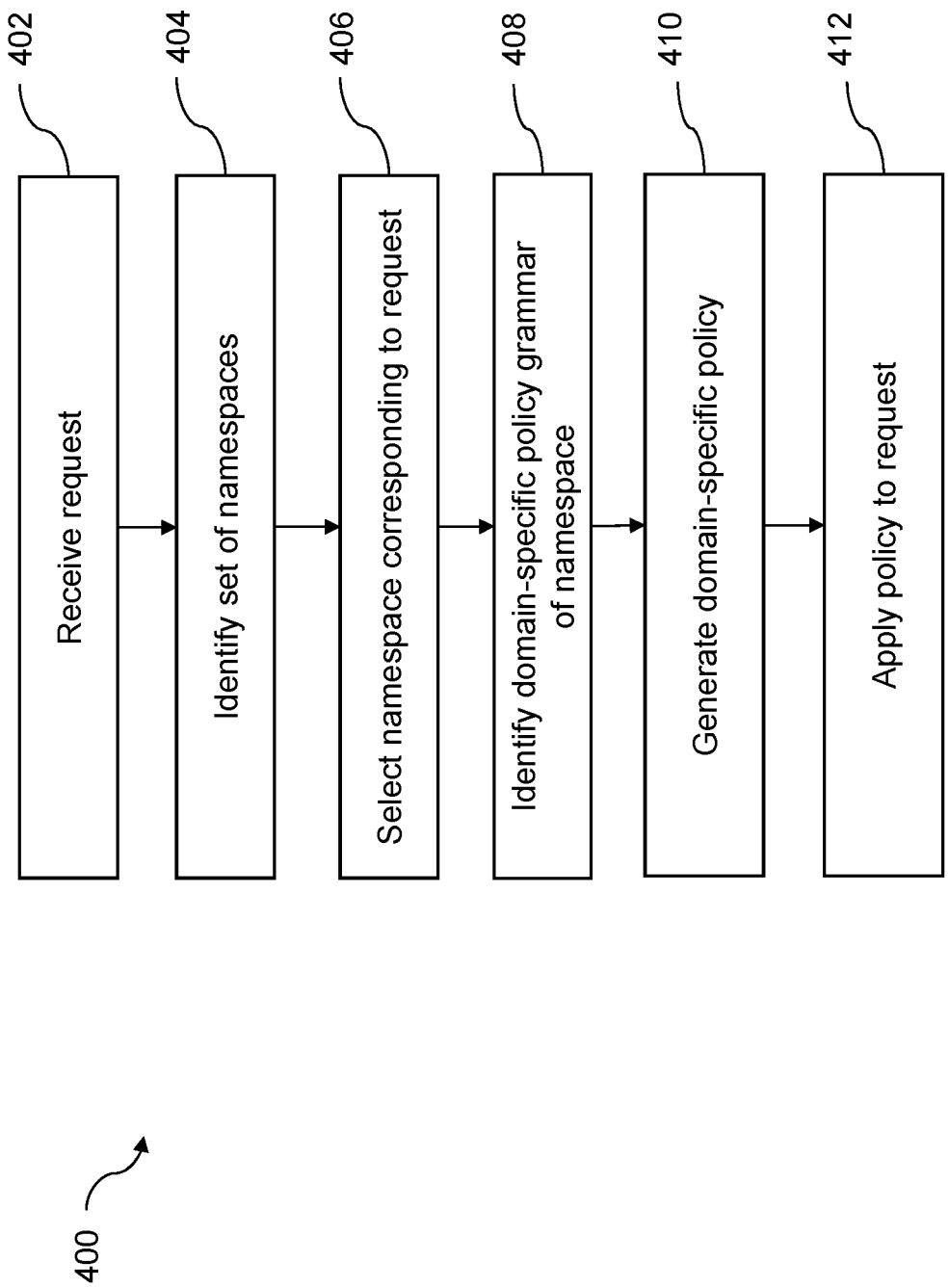
FIG. 4 is a flow diagram for an example method for controlling access to a resource in a computing environment.

Referring now to FIG. 4, a flowchart showing an example method 400 for managing access to a resource is shown. The functionalities of method 400 may be implemented using, or performed by, the components described in FIGS. 1-3, such as the client device(s) 202, the policy server 204, etc. In brief overview, at step 402, a policy server receives a request. At step 404, the policy server identifies a set of namespaces. At step 406, the policy server selects a namespace corresponding to the request. At step 408, the policy server identifies domain-specific policy grammar of the namespace. At step 410, the policy server generates a domain-specific policy. At step 412, the policy server applies the policy to the request.

At step 402, a policy server receives a request. In some embodiments, the policy server may receive a request to access a resource in a computing environment. The request may include one or more attributes. The policy server may receive the request responsive to a user providing one or more inputs or selections at a client device. The user may provide an input of a URL to a web browser, for instance. The user may provide an input of a download file selection on a webpage, a file sharing system, etc. The client device may generate a request corresponding to the inputs from the user. The client device may include the one or more attributes in the request. The client device may identify the attributes for including in the request based on data corresponding to the client device (e.g., environment), data corresponding to the input (e.g., action), data corresponding to the user (e.g., subject), and/or data corresponding to the resource (object). The client device may include various attributes in the request for transmitting to the policy server. In some embodiments, the client device may include a tenant identifier in the request for the tenant to which the client device is associated.

At step 404, the policy server identifies a set of namespaces. In some embodiments, the policy server may identify a set of namespaces having domain-specific policy grammar to generate domain-specific policies. The policy server may identify the set of namespaces corresponding to the tenant associated with the client device. The policy server may identify the set of namespaces based on the tenant identifier included in the request. The policy server may cross-reference the tenant identifier with a plurality of tenant identifiers linked to a respective set of namespaces to identify the set of namespaces corresponding to the request. The set of namespaces may include local namespaces (e.g., namespaces which are specific to the tenant) and/or global namespaces (e.g., namespaces which may be used by a plurality of tenants).

In some embodiments, the set of namespaces includes a database namespace, a networking product namespace, a file access namespace, a content filtering namespace, antivirus namespace, a uniform resource locator (URL) browsing namespace, and/or an applications namespace. Each namespace may include a domain-specific grammar which his relevant to the respective namespace. Hence, a domain-specific grammar for a database namespace may be different from a domain-specific grammar for a URL browsing namespace, as the corresponding resources (e.g., databases, websites, etc.) may have policies for addressing different types of targets. In some embodiments, the set of namespaces may include user-defined namespaces. In some embodiments, the policy server may receive a user-defined namespace for incorporation into the set of namespaces. The user-defined namespace may include a domain-specific grammar corresponding to the specific user-defined namespace. The policy server may incorporate the user-defined namespace into the set of namespaces. As such, the namespaces may be extensible to cover any number of use cases. In some embodiments, the set of namespaces may include parent namespaces and nested namespace(s) within a respective parent namespace. The parent namespaces and nested namespaces may have respective domain-specific policy grammars. For instance, the nested namespace may have a subset of the domain-specific policy grammars of the parent namespace.

At step 406, the policy server selects a namespace corresponding to the request. In some embodiments, the policy server may determine a namespace from the identified set of namespaces (e.g., at step 404) corresponds to the attribute(s)

of the request. The policy server may cross-reference at least some of the attributes from the request with target attributes of the domain-specific policy grammars. For instance, each policy grammar (e.g., for each namespace, parent namespace, nested namespace, etc.) may include at least one target indicating attributes (e.g., target attributes) corresponding to subject(s), object(s), action(s), environment(s), etc. The policy server may cross-reference at least some of the attributes from the request (e.g., received at step 402) with the target attributes from the respective namespaces. The policy server may select the namespace having target attribute(s) that match to the attribute(s) of the request.

At step 408, the policy server identifies the domain-specific policy grammar of the namespace. The policy server may identify the domain-specific policy grammar of the namespace selected at step 406. As stated above, each namespace may include a respective domain-specific policy grammar. The policy server may identify the domain-specific policy grammar specific to the namespace selected at step 406. In some implementations, the domain-specific policy grammar from the selected namespace includes a plurality of categories of policy grammar, such as targets, conditions, effects, and obligations. The domain-specific grammar of the selected namespaces may be applicable to a plurality of resources (e.g., a domain-specific grammar for a URL browsing namespace may be applicable to websites to be accessed, a domain-specific grammar for an antivirus namespace may be applicable to files to be downloaded, and so forth). In implementations where the determined namespace is a nested namespace (for instance, an antivirus namespace of a content sharing namespace), the subset of domain-specific grammar (e.g., corresponding to file downloading) may applicable to a subset of the plurality of resources (e.g., any files to be downloaded, as compared to any files being transferred, uploaded, shared, etc.) including the resource associated with the request.

At step 410, the policy server generates a domain-specific policy. In some embodiments, the policy server may generate the domain-specific policy using domain-specific policy grammar of the determined namespace. The policy server may generate the domain-specific policy grammar of the nested namespace for applying the domain-specific policy to apply to the request. The policy server may generate the domain-specific policy following identification of the domain-specific policy grammar. Hence, the policy server may leverage the domain-specific policy grammar that corresponds to the resource for constructing a domain-specific policy that applies to the resource to be accessed by the user generating the request. The policy server may generate the domain-specific policy using the attributes from the request. The policy server may use the domain-specific policy grammar (e.g., targets, conditions, effects, and obligations) to generate a domain-specific policy for the request. The policy server may generate the domain-specific policy for applying to the particular request (e.g., based on the attributes of the request, for instance). The policy server may generate the domain-specific policy by selecting, from specific categories of the domain-specific policy grammar (e.g., a condition, effect, and obligation) corresponding to the target attribute used to select the namespace from the set of namespaces (e.g., at step 406). The policy server may generate the domain-specific policy for applying to the request using the vocabularies specified in the policy grammars for the condition, effect, and obligation.

At step 412, the policy server applies the policy to the request. In some embodiments, the policy server may apply the generated domain-specific policy (e.g., generated at step 410) to the request (e.g., received at step 402) to identify an effect of the domain-specific policy for the resource, to permit or deny access to the resource. For instance, where the request is a request to download a file, the policy server may apply a domain-specific policy corresponding to an antivirus namespace which permits access to download the file when the file is indicated as a "clean" file. As another example, where the request is a request to navigate to a website, the policy server may apply a domain-specific policy corresponding to a URL browsing namespace which permits access to navigate to websites which are not included in a list of prohibited websites (or prohibited website categories). The policy server may permit or deny access to the resource according to the effect.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    receiving, by at least one computing device, a request to access a resource in a computing environment, the request including one or more attributes;
    identifying, by the at least one computing device, a set of namespaces having domain-specific policy grammar to generate domain-specific policies;

determining, by the at least one computing device, a namespace from the identified set of namespaces that corresponds to the one or more attributes of the request; and generating, using domain-specific policy grammar of the determined namespace, a domain-specific policy to apply to the request.

2. The method of claim 1, wherein the determined namespace includes at least one nested namespace having a subset of the domain-specific policy grammar from the selected namespace.

3. The method of claim 2, further comprising:
selecting, according to the one or more attributes of the request, a nested namespace from the at least one nested namespace; and
generating, using domain-specific policy grammar of the nested namespace, the domain-specific policy to apply to the request.

4. The method of claim 3, wherein the domain specific grammar of the determined namespace is applicable to a plurality of resources, and wherein the subset of domain-specific grammar is applicable to a subset of the plurality of resources including the resource associated with the request.

5. The method of claim 1, further comprising:
applying the generated domain-specific policy to the request to identify an effect of the domain-specific policy for the resource, to permit or deny access to the resource; and
permitting or denying access to the resource according to the effect.

6. The method of claim 1, comprising selecting the namespace with one or more target attributes that match to the one or more attributes of the request.

7. The method of claim 1, wherein the one or more target attributes comprise at least one of: a subject, an action, an object or an environment.

8. The method of claim 1, wherein the set of namespaces includes at least one of a database namespace, a networking product namespace, a file access namespace, a content filtering namespace, antivirus namespace, a uniform resource locator (URL) browsing namespace or an applications namespace.

9. The method of claim 1, wherein the domain-specific policy grammar from the selected namespace includes a plurality of categories of policy grammar.

10. The method of claim 1, further comprising:
receiving a user-defined namespace for incorporation into the set of namespaces; and
incorporating the user-defined namespace into the set of namespaces.

11. A device comprising:
at least one processor configured to:
receive a request to access a resource in a computing environment, the request including one or more attributes;
identify a set of namespaces having domain-specific policy grammar to generate domain-specific policies;
determine a namespace from the identified set of namespaces which corresponds to the one or more attributes of the request; and
generate, using domain-specific policy grammar of the determined namespace, a domain-specific policy to apply to the request.

12. The device of claim 11, wherein the determined namespace includes at least one nested namespace having a subset of the domain-specific policy grammar from the selected namespace.

13. The device of claim 12, wherein the at least one processor is further configured to:
select, according to the one or more attributes of the request, a nested namespace from the at least one nested namespace; and
generate, using domain-specific policy grammar of the nested namespace, the domain-specific policy to apply to the request.

14. The device of claim 13, wherein the domain specific grammar of the determined namespace is applicable to a plurality of resources, and wherein the subset of domain-specific grammar is applicable to a subset of the plurality of resources including the resource associated with the request.

15. The device of claim 11, wherein the at least one processor is further configured to:
apply the generated domain-specific policy to the request to identify an effect of the domain-specific policy for the resource, to permit or deny access to the resource; and
permit or deny access to the resource according to the effect.

16. The device of claim 11, wherein the at least one processor is further configured to select the namespace with one or more target attributes that match to the one or more attributes of the request.

17. The device of claim 11, wherein the domain-specific policy grammar from the selected namespace includes a plurality of categories of policy grammar.

18. The device of claim 11, wherein the at least one processor is further configured to:
receive a user-defined namespace for incorporation into the set of namespaces; and
incorporate the user-defined namespace into the set of namespaces.

19. A non-transitory computer readable medium storing program instructions for causing one or more processors to:
receive a request to access a resource in a computing environment, the request including one or more attributes;
identify a set of namespaces having domain-specific policy grammar to generate domain-specific policies;
determine a namespace from the identified set of namespaces which corresponds to the one or more attributes of the request; and
generate, using domain-specific policy grammar of the determined namespace, a domain-specific policy to apply to the request.

20. The non-transitory computer readable medium of claim 19, wherein the determined namespace includes at least one nested namespace having a subset of the domain-specific policy grammar from the selected namespace.

* * * * *